SYNCHRONIZED READOUT SYSTEM FOR DATA TAPE

Filed March 31, 1960 9 Sheets-Sheet 1

INVENTORS
FREDERIC P. STRAUCH, JR.
DENNIS A. WALZ
BY Moody and Goldman
ATTORNEYS

SYNCHRONIZED READOUT SYSTEM FOR DATA TAPE

Filed March 31, 1960 9 Sheets-Sheet 2

INVENTORS
FREDERIC P. STRAUCH, JR.
DENNIS A. WALZ
BY Moody and Goldman
ATTORNEYS INVENTORS
FREDERIC P. STRAUCH, JR.
DENNIS A. WALZ
BY Moody and Goldman
ATTORNEYS

SYNCHRONIZED READOUT SYSTEM FOR DATA TAPE

Filed March 31, 1960 9 Sheets-Sheet 4

INVENTORS
FREDERIC P. STRAUCH, JR.
DENNIS A. WALZ
BY Moody and Goldman
ATTORNEYS March 3, 1964 F. P. STRAUCH, JR., ETAL 3,123,810

SYNCHRONIZED READOUT SYSTEM FOR DATA TAPE

Filed March 31, 1960 9 Sheets-Sheet 5

INVENTORS
FREDERIC P. STRAUCH, JR.
DENNIS A. WALZ
BY Moody and Goldman
ATTORNEYS March 3, 1964 F. P. STRAUCH, JR., ETAL 3,123,810

SYNCHRONIZED READOUT SYSTEM FOR DATA TAPE

Filed March 31, 1960 9 Sheets-Sheet 6

INVENTORS
FREDERIC P. STRAUCH, JR.
DENNIS A. WALZ
BY Moody and Goldman
ATTORNEYS March 3, 1964 F. P. STRAUCH, JR., ETAL 3,123,810

SYNCHRONIZED READOUT SYSTEM FOR DATA TAPE

Filed March 31, 1960 9 Sheets-Sheet 7

INVENTORS
FREDERIC P. STRAUCH, JR.
DENNIS A. WALZ
BY Moody and Goldman
ATTORNEYS INVENTORS
FREDERIC P. STRAUCH, JR.
DENNIS A. WALZ
BY Moody and Goldman
ATTORNEYS

SYNCHRONIZED READOUT SYSTEM FOR DATA TAPE

INVENTORS
FREDERIC P. STRAUCH, JR.
DENNIS A. WALZ
BY Moody and Goldman
ATTORNEYS

United States Patent Office 3,123,810
Patented Mar. 3, 1964

3,123,810
SYNCHRONIZED READOUT SYSTEM FOR DATA TAPE

Frederic P. Strauch, Jr., Glendale, and Dennis A. Walz, Van Nuys, Calif., assignors to Collins Radio Company, Cedar Rapids, Iowa, a corporation of Iowa
Filed Mar. 31, 1960, Ser. No. 19,012
16 Claims. (Cl. 340—174.1)

This invention relates to a digital tape readout system which synchronizes its data output with a local timing source. While the invention is primarily intended to be used with magnetic tape, it can also be used with perforated tape, inked tape, or tape having any type of digital recording technique.

A data tape synchronizing system is required when it is desired to transmit tape recorded digital data by means of a synchronous communication system. Synchronous communication systems are capable of transmitting digital data at higher rates with fewer errors than are corresponding nonsynchronous communication systems. Since the ordinary type of data tape reader operates nonsynchronously, it is impossible to provide an operable direct connection between it and a synchronous communication system. Accordingly, it has been necessary to interpose a device which can convert the nonsynchronous data into synchronous form.

Other systems for synchronizing data from magnetic tape have involved reading the tape nonsynchronously into a buffer storage and utilizing electronic means to synchronously readout the data from storage. Such systems are generally dependent upon a particular tape format or a limited range of tape formats. At present, buffer storage elements account for a large portion of the costs of such other synchronizing systems.

It is an object of this invention to incorporate synchronization directly into the readout from a tape transport mechanism.

It is another object of the present invention to provide a data-tape reader which is capable of providing a synchronous readout of the data without using any expensive buffer storage devices.

It is still another object of this invention to provide a data tape synchronizing system which can readout data independently of its recorded format.

It is a further object of this invention to provide an electro-mechanical system which can synchronously readout data from a digitally-recorded tape, even though the data was originally recorded nonsynchronously.

It is still another object of this invention to provide a data tape synchronizing system which can be manufactured at less cost than presently available tape synchronizers.

It is a feature of this invention to provide a data tape reader having a servo circuit which is capable of reacting in a predetermined manner to provide a synchronous readout of data bits without losing a single bit from a block of data.

The invention involves an improvement for a digital tape transport mechanism wherein its tape speed is instantly modified as required to readout data in synchronism with a local timing source.

The data bits may be closely packed longitudinally on the tape, such as for example two hundred or more bits to the inch. The tape transport mechanism preferably is designed so that its driven parts have a minimum amount of inertia to obtain required acceleration and/or deceleration with a least amount of torque. The free-running speed of the system can read the tape faster, slower, or approximately at the rate of the synchronous timing source, according to a particular design of the invention. Unless an intermediate delay is provided, the invention accelerates or decelerates the system during the first bit being read from the tape head to obtain immediately a one-for-one correspondence between bits obtained directly from the tape and a local synchronous timing source used to sample and provide a synchronous-bit readout for the system. It is not essential in the invention that the head readout be phase-locked with the synchronous timing source, as long as the one-for-one relationship is maintained; and this permits a substantial amount of overshoot for system operations without degradation of the synchronous output.

Further objects, features and advantages of this invention will become apparent upon further study of the specification and the accompanying drawings, in which.

Figure 1:
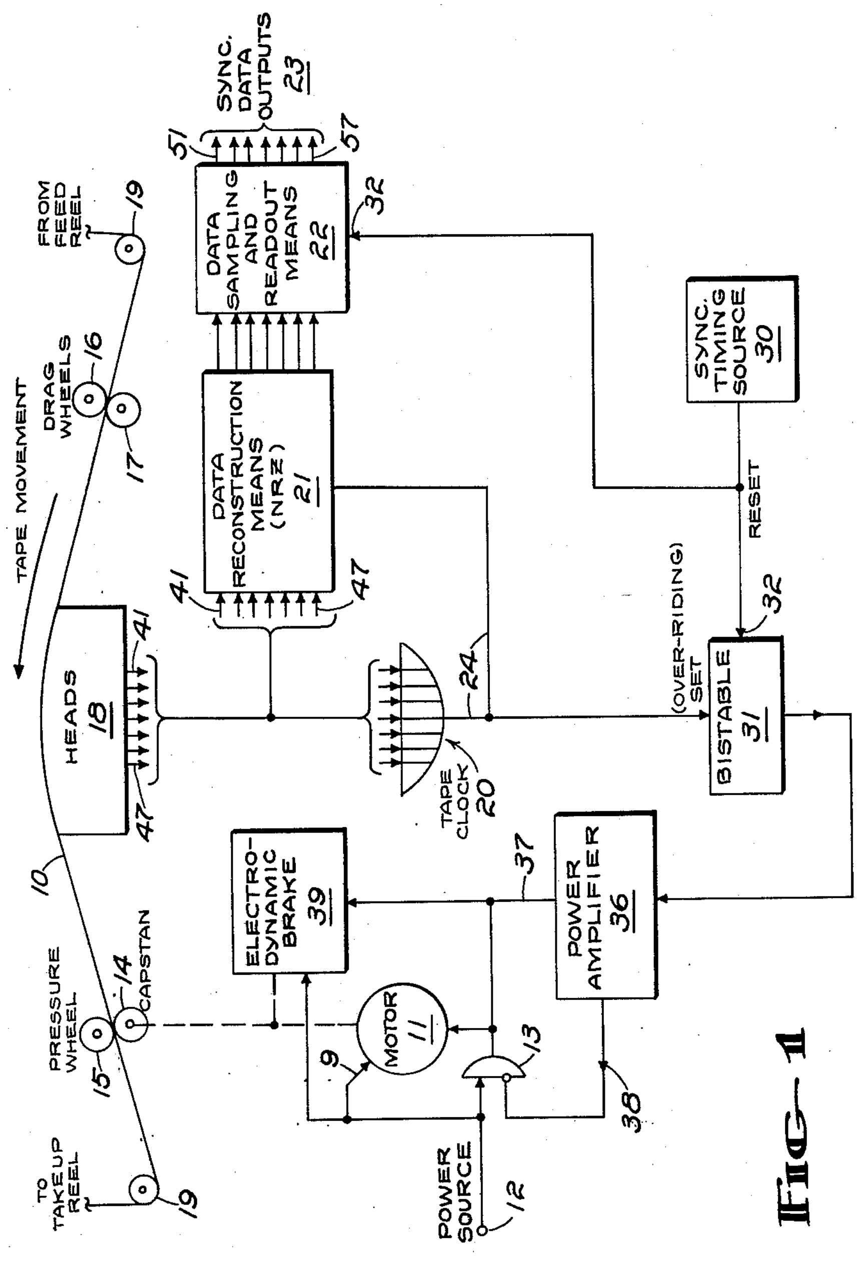
FIGURE 1 is an embodiment of one form of the invention.
Figure 4:
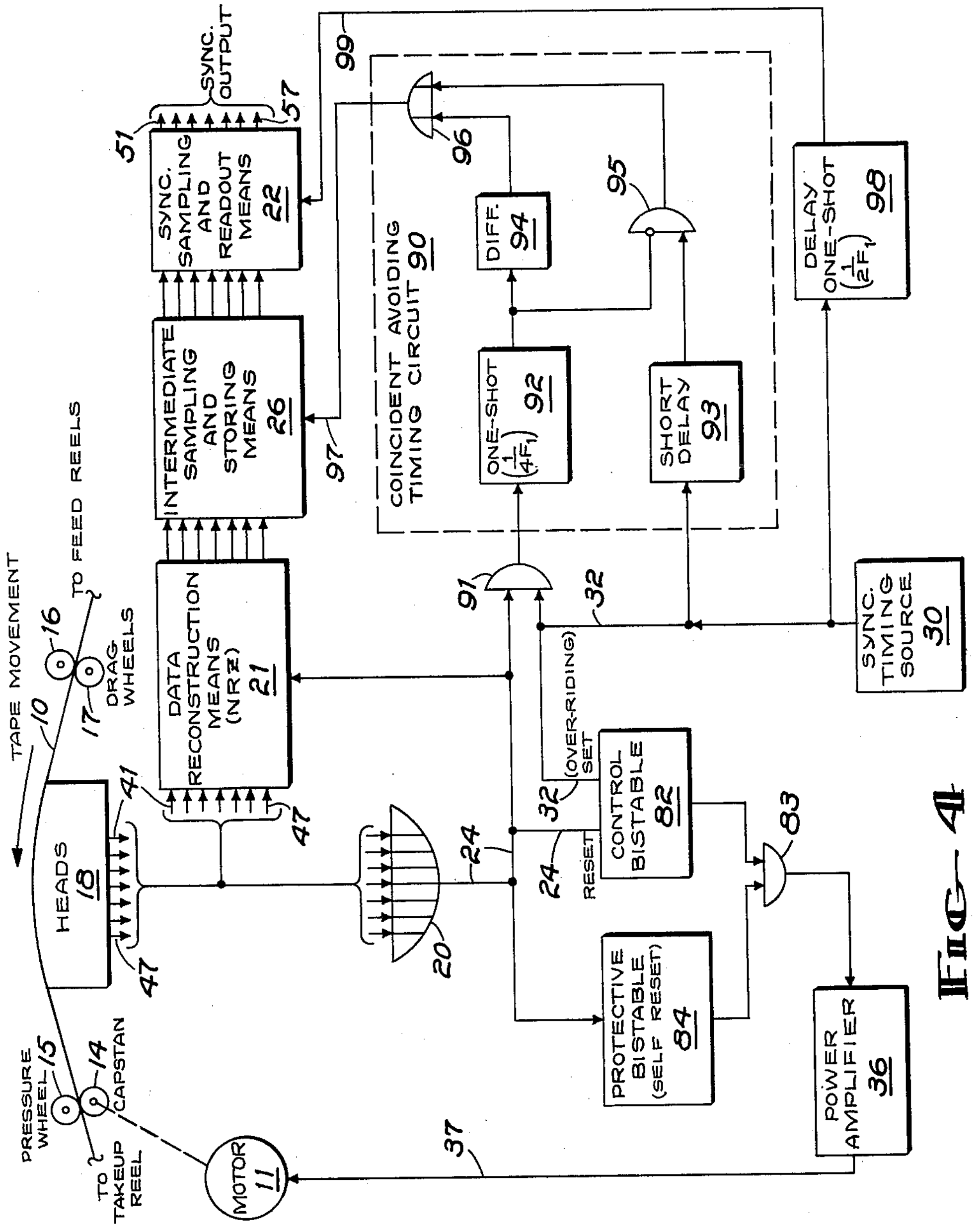
Figure 5:
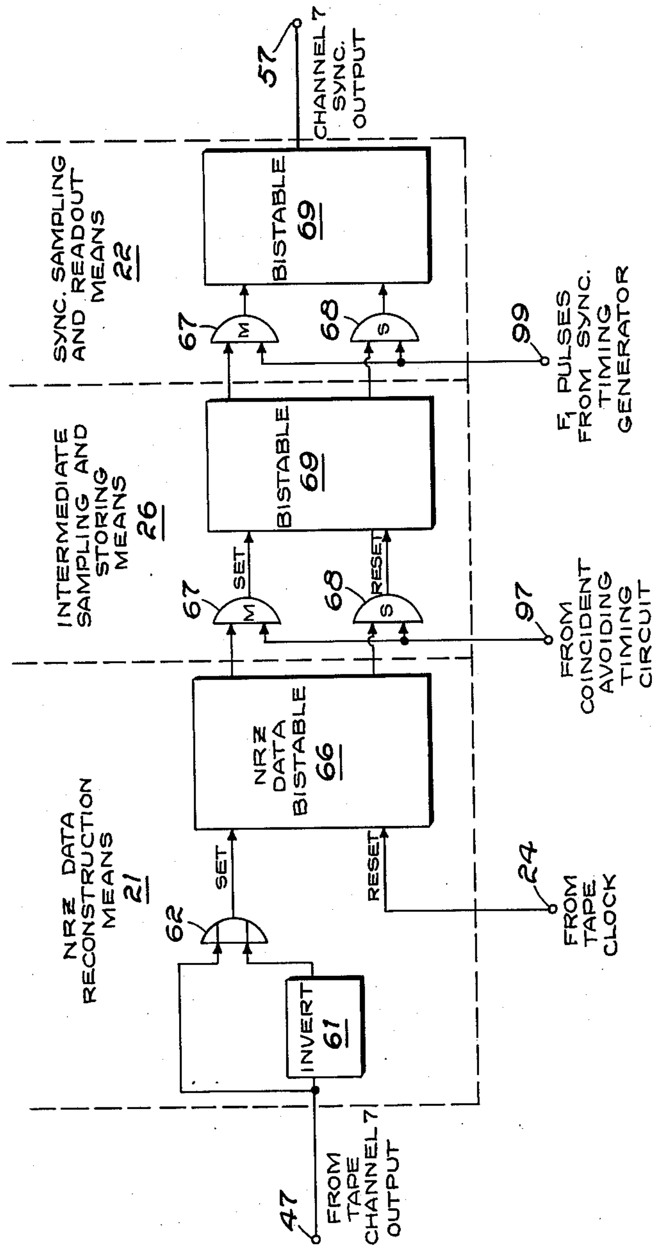
Figure 8:
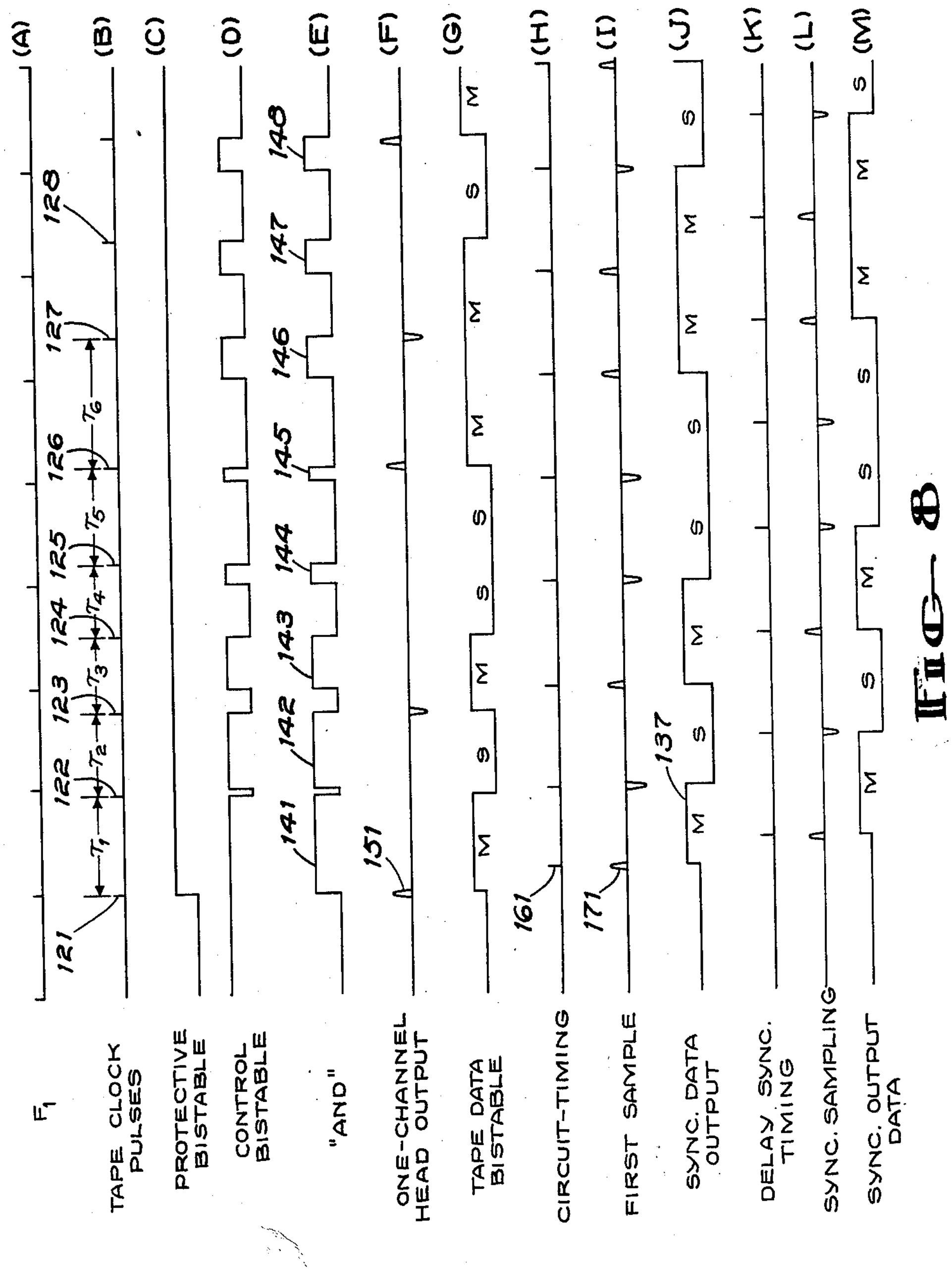
Figure 9:
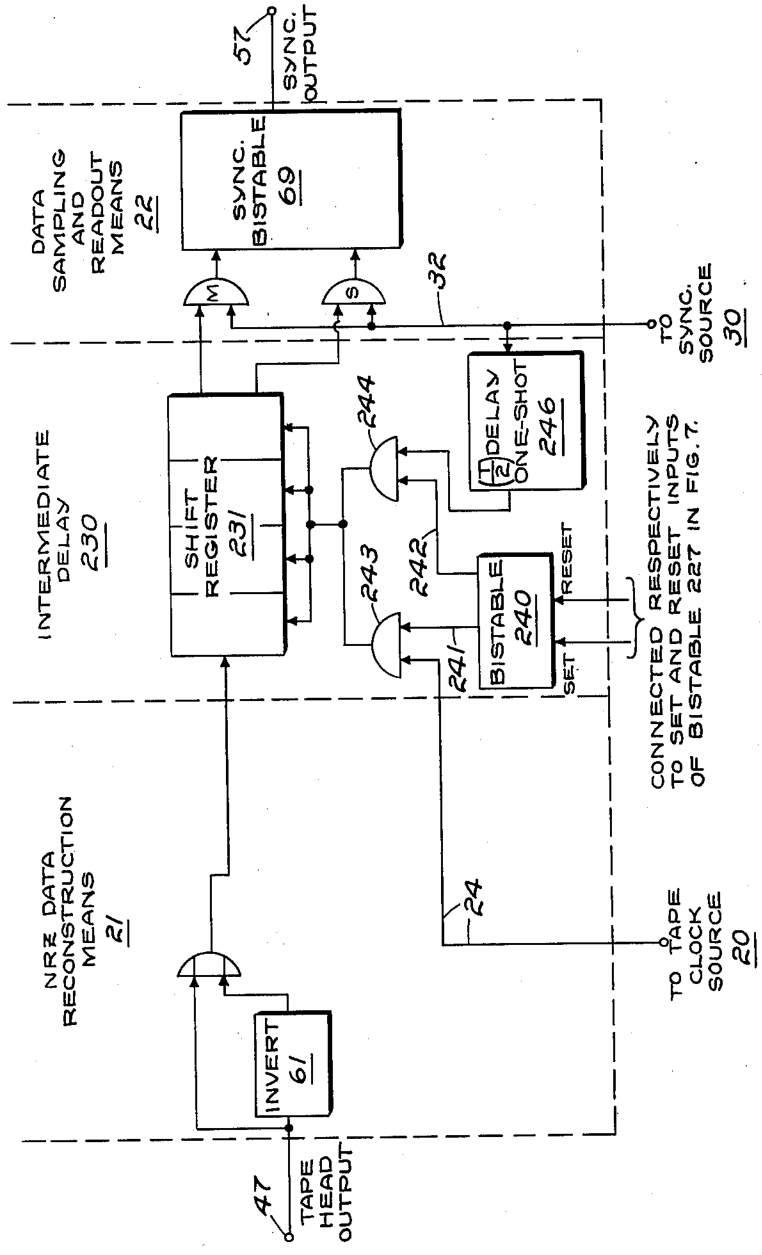

FIGURES 3(A)–(G) provide waveforms used in explaining the operation of FIGURE 1;

FIGURE 4 illustrates another embodiment of the invention;

FIGURE 5 shows a portion of FIGURE 4 in more detail;

FIGURES 6(A)–(M) provide waveforms used in explaining the operation of FIGURE 4;

FIGURE 7 shows still another form of the invention;

FIGURES 8(A)–(H) provide waveforms used in explaining the operation of the invention in FIGURE 7; and FIGURE 9 shows a modified circuit for the readout portion of the invention.

The drawings are considered below for explanations of particular examples of the invention.

The example of FIGURE 1 basically provides a controlled braking system that slows a motor 11 to the speed required to obtain synchronous processing of the digital bits read from the tape.

The example shown in FIGURE 1 includes a magnetic tape 10, which has seven digital channels recorded upon it in the conventional manner. It may in fact have any number of parallel channels.

For the purposes of this embodiment, it is presumed that non-return-to-zero (NRZ) digital recording is provided on the tape. However, the invention can use any type of digital recording method; and there are several others known in the art.

The data will have a packing density on the tape of some nominal amount, such as two hundred bits per inch. However, this nominal amount may vary considerably without interfering with the operation of the invention. Tape stretch will normally account for much of the variation in packing density, and will reduce the bit density per inch. Tape 10 is mounted on a tape transport mechanism, wherein parts that are not shown may be conventional. The tape is clamped between a capstan 14 and a pressure wheel 15 so that counterclockwise rotation of the capstan moves the tape to the left in FIGURE 1. A motor 11 rotates capstan 14 at a speed which is controlled by the invention.

Tape movement carries it by a plurality of heads 18, which respectively read the channels and provide outputs 41–47.

Drag wheels 16 and 17 clamp the tape on the opposite side of heads 18 from the capstan, and provide a small amount of tension on the tape to maintain it properly against the heads.

A synchronous timing source 30 sets the timing rate of the invention. It is also used for timing a synchronous transmission of tape data from the invention by communication means not a part of this invention. Source 30 is a stable oscillator device providing very short pulses at the synchronous rate.

A motor 11, in the embodiment of FIGURE 1, has a free-running speed which would cause the tape to be read at a rate faster than the synchronous rate of source 30 under all bit density variation conditions on the tape, in the absence of a servo feedback provided by the invention.

The free-running power for motor 11 is obtained from a power terminal 12 connected to an input of motor 11 through a normally-enabled "and" gate 13. Motor 11 may be a direct current or alternating current type, but for purposes of this disclosure it is considered a direct-current motor of the shunt-wound type. Input 9 is provided directly to the field windings.

A tape-clock generator 20 is connected to the multi-channel heads 18 in the conventional manner to derive pulses timed with the data bits on the tape, but not necessarily synchronized with the synchronous pulses from source 30 during the operation of the invention. Thus, a lead 24 receives the tape-clock pulses.

A data reconstruction means 21 of conventional type reconstructs the NRZ tape output into a mark-space binary signal for each channel. It has respective inputs connected to the channel outputs of the heads, and has its tape-clock timing input connected to lead 24.

A data sampling and readout means 22 receives the respective outputs from means 21 and has a timing input connected to lead 32 to receive synchronous timing pulses from source 30. The synchronous timing pulses within means 22 synchronously sample the nonsynchronous data provided from means 21. A synchronous output is provided from readout means 22 in FIGURE 1.

Although the data output of reconstruction means 21 is nonsynchronous at times, it is essential that its output maintain a bit correspondence with the synchronous timing pulses of source 30, on the basis of one and only one synchronous timing pulse occurring during any single bit period directly provided from the tape. This is the "one-for-one correspondence" referred to in this specification.

It is not necessary with this invention that the tape movement be controlled to the precise speed needed to have a phase-lock between tape-clock pulses and the synchronous-timing pulses, since a phase-lock is not necessary to provide a one-for-one correspondence between the reconstructed tape bits and the synchronous timing pulses. In order to provide the one-for-one correspondence in the system of FIGURE 1, its deceleration capacity must be sufficient to enable the system to quickly decrease its speed after sensing a first tape-clock pulse, so that a second tape-clock pulse is spaced from the first by a time that is greater than the synchronous period T of synchronous source 30 under the condition of a large phase error by the first tape-clock pulse.

Accordingly, the inertia of moving parts in the tape transport mechanism is preferably maintained as small as possible to minimize the deceleration capacity needed for the system in FIGURE 1.

The deceleration operation is accomplished two-fold in FIGURE 1. Firstly, motor 11 itself is utilized as a dynamic brake by applying a braking signal to it from a power amplifier 36, which provides a braking signal of opposite polarity from the power signal at terminal 12. A braking signal 38, derived from a power amplifier 36, inhibits "and" gate 13 to block input power to the motor armature. The braking signal from amplifier output 38 has opposite polarity from the power source and is substituted in the armature of motor 11. An auxiliary dynamic brake 39, which also may be a shunt-wound motor having its field winding connected to source 12 provides additional braking capacity to that of the motor 11. It is obvious that there are other types of brakes available which could be used, such as electromagnetically-actuated frictional brakes, and response time is a prime consideration.

As previously stated, proper control of the braking system is essential to the operation of the system in FIGURE 1. This control is obtained by a signal derived from a timing comparison between the tape-clock pulses and the synchronous timing pulses. A bistable circuit 31 provides the required timing comparison by having a set input connected to lead 24 to receive the tape-clock pulses and by having a reset input connected to lead 32 to receive the synchronous-timing pulses. The output of bistable 31 provides control pulses having a duration proportional to the required deceleration, and they are provided to inputs of power amplifier 36 and brake 39. Thus, the output of bistable 31 develops the braking-control signal of the system.

Figure 3:
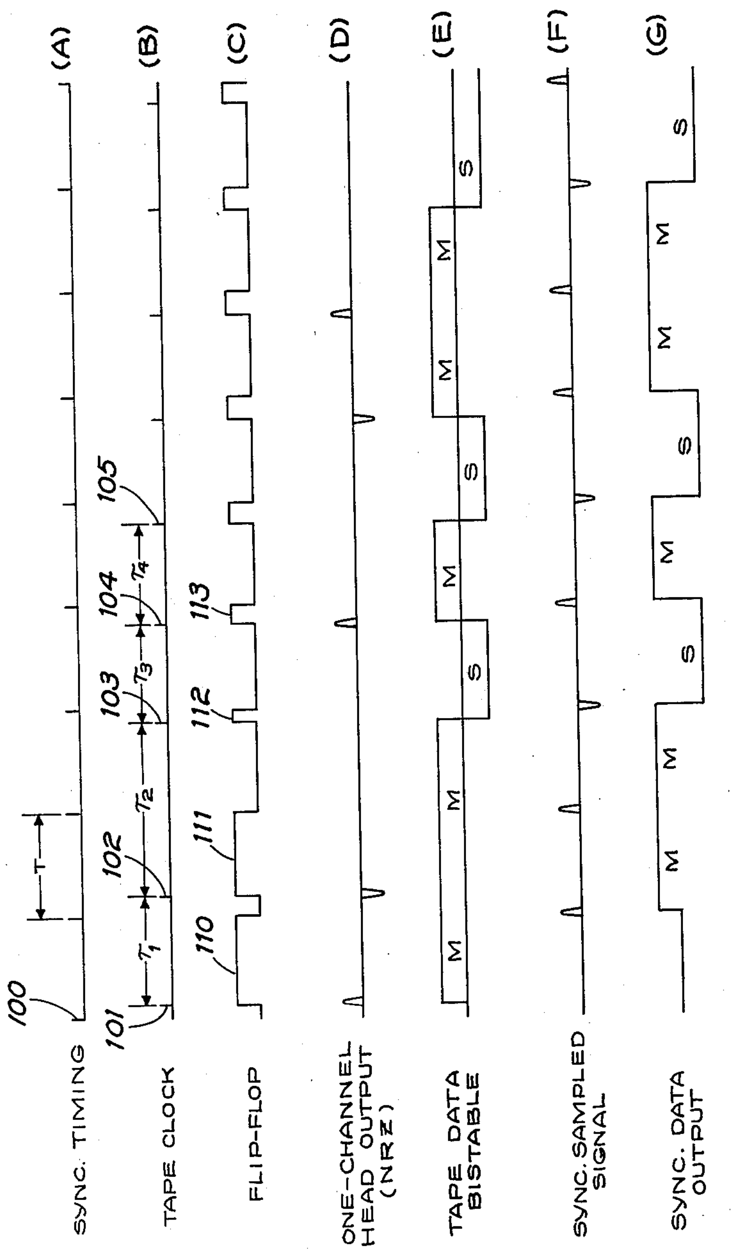

FIGURE 3 enables an explanation of the operation of FIGURE 1. FIGURE 3(A) shows a sequence of synchronous-timing pulses from source 30, having a period T. FIGURE 3(B) illustrates tape-clock pulses provided under the surveillance of the servo feedback control of the invention.

After power has been applied to motor 11 and it has reached its free-running speed, pressure wheel 15 is applied to the tape; and it immediately begins running at a speed which would provide tape-clock pulses at a rate faster than synchronous-timing rate $F_1$, in the absence of servo feedback operation. The tape between the pressure and drag wheels has little inertia, and is isolated from the inertia of the tape-reels by snubber wheels 19 supported on spring-biased arms (not shown). The first tape-clock pulse 101 in FIGURE 3(B) can have any phase relationship to the synchronous timing pulses and is shown slightly later than a synchronous pulse 100. Without any feedback control, the next tape-clock pulse 102 would undesirably occur prior to the next occurring synchronous pulse; and this would prevent the required one-for-one correspondence, since no synchronous pulse would occur during the first tape bit. Accordingly, it is essential that the feedback system immediately slow down the tape movement; so that the second clock pulse 102 occurs after the next synchronous pulse, as shown in FIGURE 3(B), to provide a tape-bit period $\tau_1$ between the first two tape pulses, which is greater than the synchronous period T.

The first tape pulse 101 sets bistable 31 to provide a deceleration control pulse 110 shown in FIGURE 3(C), which is terminated by the next synchronous pulse that resets the bistable circuit. Braking control pulse 110 has very close to a maximum duration, which cannot exceed T. The long braking pulse 110 slows down the system to below its synchronous rate, thus providing second tape pulse 102 after the next synchronous pulse to obtain the required one-for-one correspondence.

However, if the first tape-clock pulse occurs at a substantially later phase than shown, the requirements for deceleration are less stringent. That is, where the first tape pulse occurs at a very late synchronous phase, less deceleration is needed to make a second tape-clock pulse occur after the next synchronous timing pulse; and first period $\tau_1$ may then be less than the synchronous period T.

Accordingly, the initial braking response of the system is controlled by the relationship between the first tape-clock pulse 101 and the next occurring synchronous pulse. The longer the time between them, the more deceleration is needed in order to assure that the second tape-clock pulse will occur after the next synchronous pulse. This type of control is thus obtained by bistable 31. Hence, the duration of a braking-signal pulse increases in proportion to the amount of deceleration required for the system.

Furthermore, bistable 31 is reset by the synchronous pulses to provide no output when no tape pulses are being read.

Second tape pulse 102 falls at a somewhat later phase with respect to the synchronous pulses than did the first tape pulse. Hence, bistable triggering by second pulse 102 and the next synchronous pulse generates a braking-signal pulse 111, which is shorter than first braking-signal pulse 110. However, braking pulse 111 has sufficient duration to provide further significant deceleration, so that a third tape pulse 103 falls at a much later synchronous phase position. Hence, period $\tau_2$ is greater than $\tau_1$. However, it is essential that the additional deceleration provided by braking pulse 111 not decelerate the tape to an amount which would cause the third pulse 103 to occur much later, because the required one-for-one correspondence would be violated with an extra synchronous pulse.

Consequently, the third braking pulse 112 will have a very short duration, which is insufficient to completely counteract the torque of the motor 11 over next tape-clock period $\tau_3$; so that the tape accelerates to provide the next tape pulse 104 at a slightly advanced phase. A braking pulse 113 is then generated which just balances the torqueing effect of the motor over the next period $\tau_4$, so that the next tape pulse 105 has about the same relative phase position as did tape pulse 104. Accordingly, the tape speed has reached a substantially stable state, and the tape-clock pulses in the remaining portion of a block of data being read will maintain substantially the same relative phase position with respect to the synchronous pulses, except for minor corrections needed to compensate for variations in the recorded bit density.

At the end of each block of data, the system will lose synchronization if no clock pulses are provided in the intervening period. When the next data block is reached, the system goes through an operation similar to that described above.

Coincidence between a first pulse 101 and a synchronous pulse does not interfere with the required one-for-one correspondence in the deceleration system of FIGURE 1, since a coincident synchronous pulse is not considered as being within the tape bit period $\tau_1$. Furthermore, the coincident situation requires maximum deceleration; and it generates a maximum duration braking-signal pulse with a duration T. Thus a coincident tape-clock pulse at the set input of bistable 31 over-rides the synchronous pulse at the reset input and sets bistable 31.

FIGURE 3(D) illustrates an example of the signal provided from the tape head of one channel with a NRZ recording technique, wherein a pulse of either polarity is provided for a data mark and no pulse is provided for a data space. The mark-data pulses in FIGURE 3(D) correspond in time with the tape-clock pulses in FIGURE 3(B), and the occurrence of a tape-clock pulse without a tape-data pulse signifies a data space. Because of a parity channel, there is always at least one tape pulse in each lateral word, to assure continuity in the pulsed output from tape-clock 20.

The data pulses shown in FIGURE 3(D) and the clock pulses shown in FIGURE 3(B) permit one of seven identical units within data reconstruction means 21 to generate a mark-space signal, as shown in FIGURE 3(E); which however is nonsynchronous since the tape-clock pulses are nonsynchronous. Nevertheless, there will be a one-for-one correspondence between the nonsynchronous data bits in FIGURE 3(E) and the synchronous pulses in FIGURE 3(A), since one and only one synchronous pulse occurs during any reconstructed data bit in FIGURE 3(E). Hence, data sampling and read-out means 22 receives the nonsynchronous data of FIGURE 3(E) and samples it with the synchronous timing pulses of source 30, with the sampling being illustrated in FIGURE 3(F). The synchronous output data wave in FIGURE 3(G) is generated using the synchronous samplings represented by FIGURE 3(F).

Figure 2:
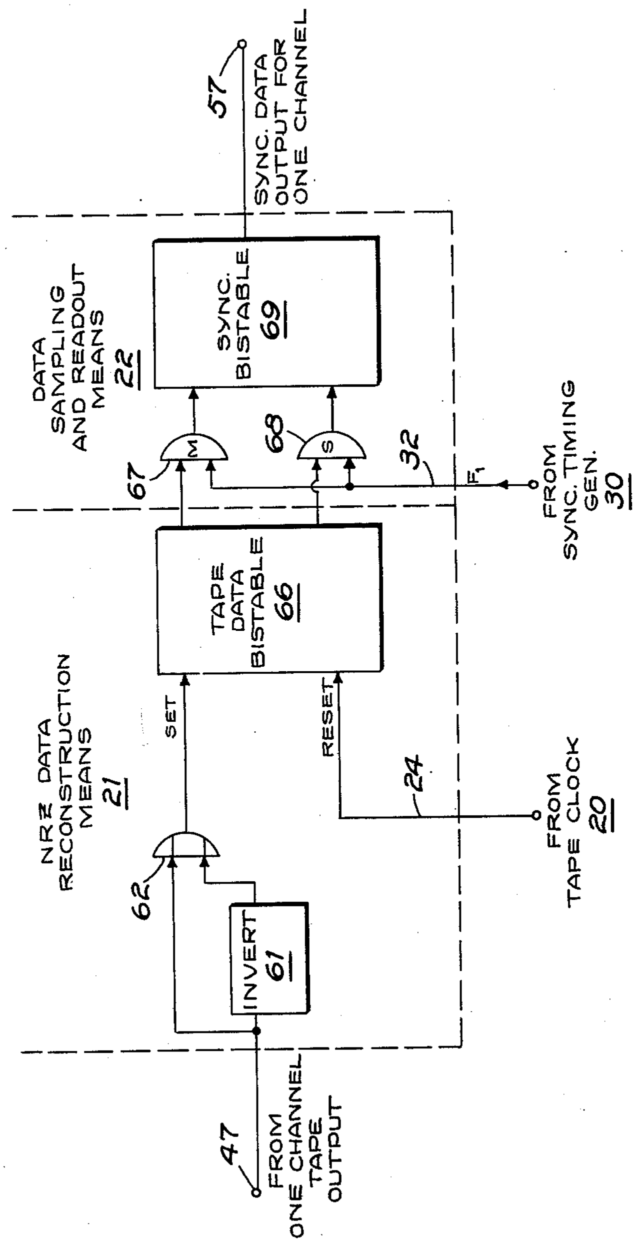
FIGURE 2 illustrates a portion of FIGURE 1 in more detail.

FIGURE 2 illustrates in more detail one of the seven identical units within data means 21 and 22 of FIGURE 1. The arrangement of FIGURE 2 can be repeated for each of the other channels provided from the tape. For example, lead 47 provides data read by one of the seven channel heads.

An inverter 61 and one input to an "or" gate 62 are connected to lead 47; and another input of "or" gate 62 receives the inverter output. Accordingly, "or" gate 62 with inverter 61 rectifies the polarity of NRZ tape pulses.

A bistable circuit 66 has a set input connected to the output of "or" gate 62. A reset input of bistable 66 receives the tape-clock pulses from lead 24. Hence, gate 62 provides a set pulse when a mark occurs to override the clock pulse at the reset input and set the bistable to a mark condition. When a space occurs, no pulse is provided to the set input, and the clock pulse at the reset input triggers bistable 66 to a space condition. Thus, one of the outputs of bistable 66 provides a wave of the type shown in FIGURE 3(E). Its other output is an inverted form of the same wave.

The opposite outputs of bistable 66 are synchronously sampled by a pair of "and" gates 67 and 68 within sampling and read-out means 22 to provide opposite triggering inputs to a bistable 69. Thus, other inputs to gates 67 and 68 receive the synchronous timing pulses. Consequently, either output of bistable circuit 69 provides synchronous data to a lead 57.

The embodiment of FIGURE 4 uses a tape-transport mechanism of the same type as in FIGURE 3 and has the same reference numerals for corresponding items.

However, the embodiment of FIGURE 4 operates its motor 11 at a free-running speed which would obtain a tape data readout slower than the synchronous rate under all free-running conditions. Motor 11 has sufficient torque capacity to accelerate the tape during the time between first and second tape-clock pulses to obtain a period $\tau_1$ between them of less than a synchronous period T. A normal power input is provided to motor 11 from amplifier 36 when it is not receiving any acceleration signal to obtain the required slow free-running speed. Thus, the servo input to power amplifier 36 in FIGURE 4 adds to its output power to increase the torque of motor 11. In FIGURE 4, motor 11 may be a series-wound direct-current type for maximum torque.

It is also desirable in the system of FIGURE 4 to maintain the inertia of its mechanically moving parts as small as possible to minimize the motor torque requirements.

The servo operation in FIGURE 4 involves the same type of time comparison used in FIGURE 1, and the acceleration signal is the inverse of the deceleration signal provided in FIGURE 1. Thus, in FIGURE 4, the time interval between a synchronous pulse and the following tape-clock pulse is sensed by a control bistable 82. Control bistable 82 has its set input connected to lead 32 for being triggered by the timing pulses, and has its reset input connected to lead 24 to receive the tape-clock pulses. If the input connections were reversed, the complementary bistable output would be used.

An "and" gate 82 has an input connected to the output of bistable 82, and one input is enabled when bistable 82 is set. An output of "and" gate 83 is provided to an input of amplifier 36 and is amplified as an acceleration signal for motor 11.

A protective bistable 84, which may be a delay flip-flop, is provided to prevent an output acceleration signal from occurring when no tape-clock pulses are obtained, since the synchronous timing pulses trigger a signal from bistable 82. Accordingly, an additional enablement for gate 83 is required from protective bistable 84 before gate 83 can provide an output. Protective bistable 84 has a set input connected to lead 24 and has an output connected to "and" gate 83. The first tape-clock pulse of a data block sets bistable 84 to enable gate 83 and simultaneously resets bistable 82 which disables gate 83 until the next synchronous pulse. Bistable 84 is of the self-resetting type; wherein it resets itself after a time between one and two periods T with no input tape pulses. Such bistable circuits are well known in the art, and are basically monostable circuits when set, bistable 84 provides a disabling input to gate 83, thus preventing an enabling signal from bistable 82 from causing acceleration when not desired.

FIGURES 6(A)–(E) illustrate the operation of the servo system in FIGURE 4. The first tape pulse 121 in FIGURE 4(B) is presumed coincident with a synchronous timing pulse; because this is the worst possible situation in the random phasing between a first tape-clock pulse and the synchronous timing. Tape clock pulse 121 simultaneously sets bistables 82 and 84, because the set input of bistable 82 over-rides its reset input. Accordingly, all of the inputs to "and" gate 83 are enabled; and it begins an accelerating signal control pulse 141 in FIGURE 6(E), which is amplified and provided to motor 11 to begin its acceleration as soon as tape-clock pulse 121 is provided. The acceleration continues until the next tape-clock pulse 122 ends control pulse 141. The acceleration of the tape is sufficient to make the second tape pulse 122 occur before the next occurring synchronous pulse. Acceleration control pulse 141 has a maximum duration under this coincident situation to provide a maximum acceleration which obtains a time spacing $\tau_1$ between first and second tape-clock pulses 121 and 122 that is less than a synchronous period T. A one-for-one correspondence is obtained by delaying the coincident synchronous pulse before using it to sample the first reconstructed tape bit with an intermediate storage and sampling means 26, prior to a synchoronus sampling and readout of the system by means 22 in FIGURE 4.

The phasing of tape pulse 122 determines the duration of a following control pulse 142. A next tape bit 123 results and is spaced by time $\tau_2$ from tape pulse 122. Control pulse 142 adds further to the speed of the tape, and time $\tau_2$ is less than $\tau_1$. A more lagging phasing results for tape pulse 123.

The position of tape pulse 123 causes a shorter control pulse 143 to follow, resulting in fourth tape pulse 124.

Motor 11 has at this time nearly reached a peak of its velocity. Shortened control pulse 143 does not increase the acceleration further because it just overcomes losses at the fast tape speed. However, the fast speed of the tape further advances the phase of the next tape pulse 125. The resulting control pulse 144 is too short to overcome the drag existing at the fast speed. Hence, the tape decelerates to provide a sixth tape pulse 126 after a period $\tau_5$ which is longer than $\tau_4$, although the phase of pulse 126 advances stil further. A very short control pulse 145 results which also cannot overcome the drag on the tape. Thus, the motor slows down more to provide a long period $\tau_6$ ending with a phase-delayed tape pulse 127, resulting in a control pulse 146 that accelerates the motor to operate at a speed that very nearly obtains continuous synchronization between tape pulses and synchronization pulses. With the next tape pulse 128 and following tape pulses, the system enters a substantially steady-state phase condition; except for minor corrections needed to overcome variations in bit density, etc. The steady-state situation is obtained when the control pulses have the proper duration to maintain the tape speed at the synchronous rate.

Figure 6:
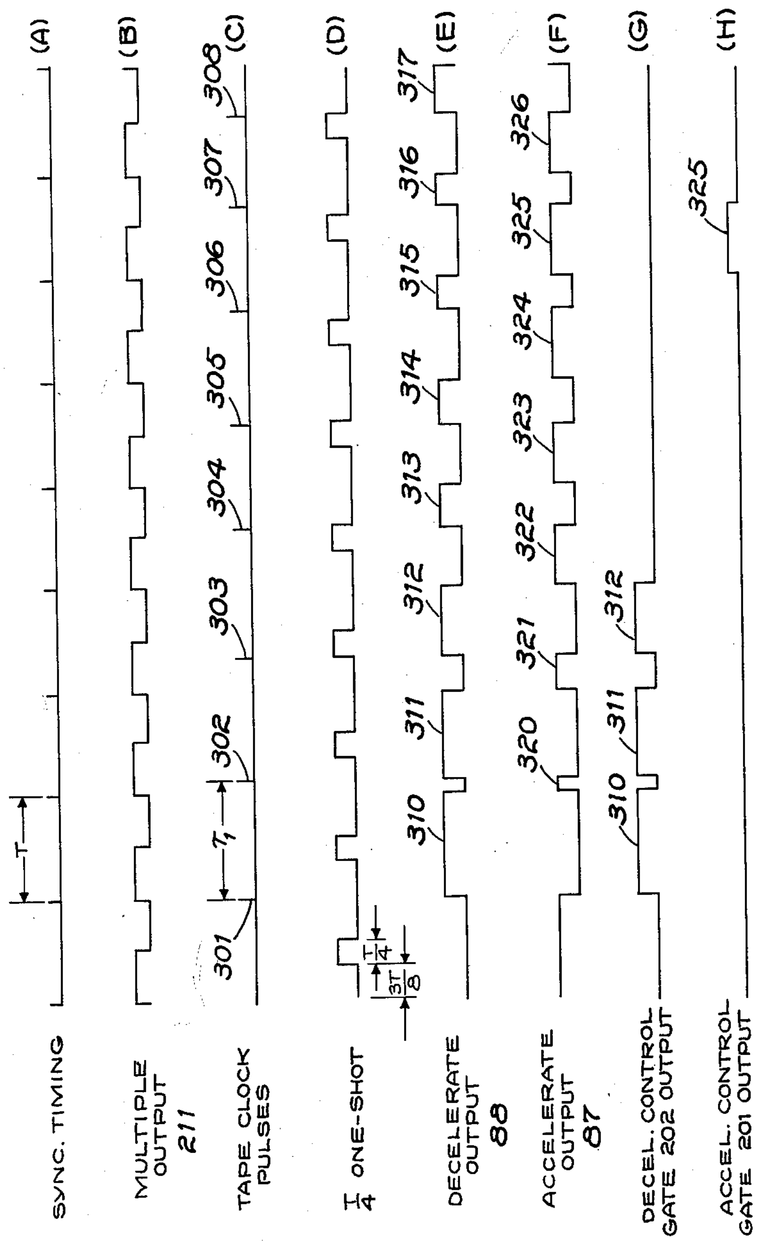
Figure 11:
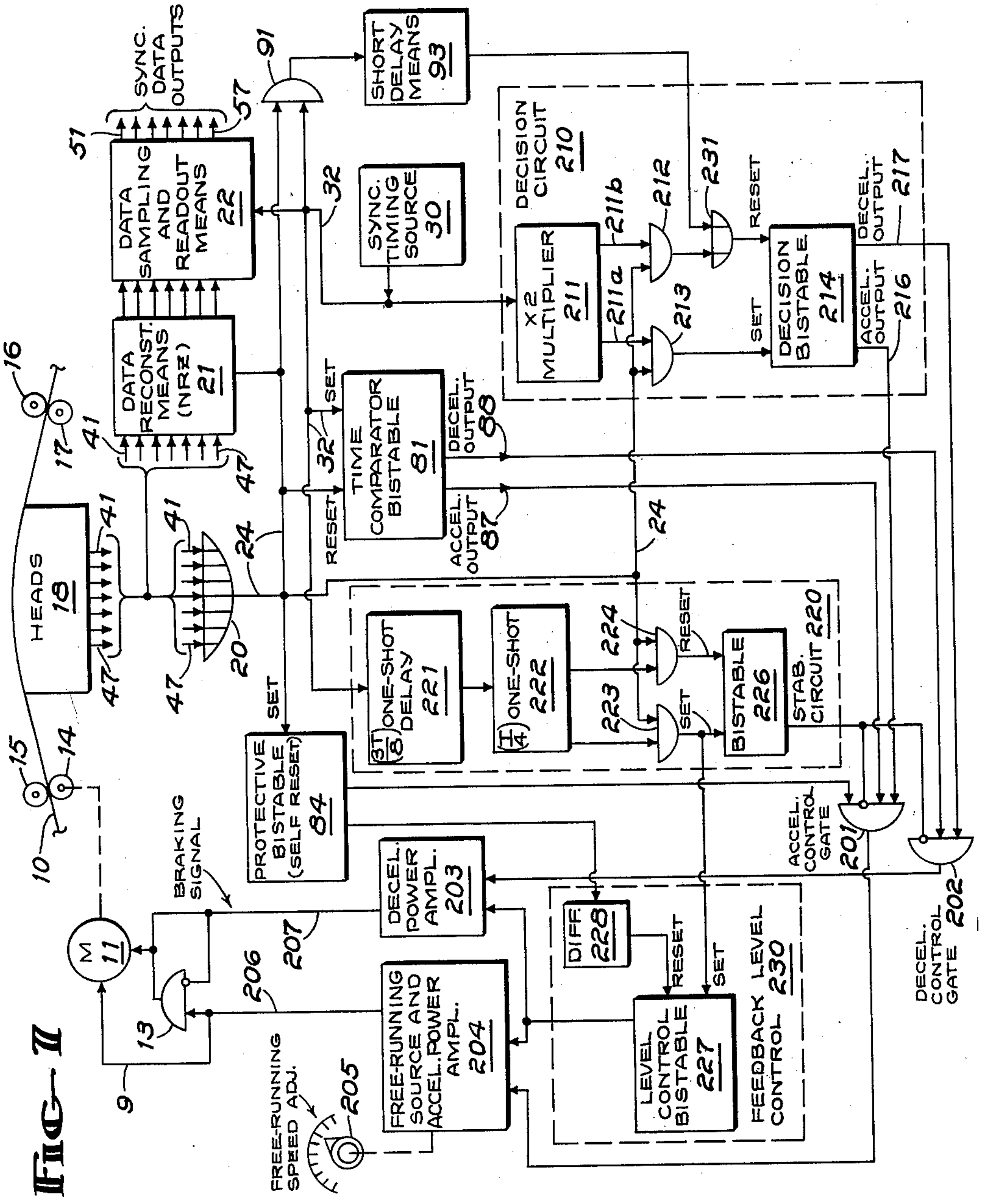

A one-for-one correspondence has thus been obtained between the tape data bits and the synchronization timing pulses, which can be seen by comparing FIGURES 6(A) and (B), except for the synchronization timing pulse coincident with first tape pulse 121.

FIGURE 6(F) illustrates a tape head readout for one channel with the tape pulse timing given in FIGURE 6(B). FIGURE 6(G) shows the corresponding data reconstructed by data means 21 in FIGURE 4.

Intermediate sampling and storing means 26 and readout means 22, in FIGURE 4 are each constructed in the same manner as readout means 22 in FIGURE 1. A timing input 97 in FIGURE 4 provides the synchronization timing pulses, except when a coincident situation exists wherein the timing pulse is delayed by a fraction of a synchronous period T, such as for example ¼T.

A coincident-avoiding timing circuit 90 processes the timing at input 97. Normally when there is no coincidence, the synchronization timing pulses are provided through a very short delay means 93, an enabled "and" gate 95, and an "or" gate 96 to input 97. The delay of means 93 is very short and is only slightly longer than the transient triggering condition of a one-shot 92, and for example is not more than 0.02T.

An "and" gate 91 determines the existence of coincidence and has inputs connected to leads 24 and 32. Hence, it only provides an output pulse when coincidence exists between a tape pulse and a synchronous pulse.

One-shot 92 is triggered by the output of gate 91 and provides a pulse with a duration which is a substantial part of period T, such as T/4. The one-shot pulse inhibits "and" gate 95 and thus prevents a slightly-delayed coincident synchronous pulse from passing to input 97. Delay means 93 permits time for one-shot 92 to trigger and block gate 95 before the synchronous pulse reaches it. The trailing edge of the one-shot pulse is differentiated by 94 and passed through "or" gate 97 to provide a substitute pulse about T/4 microseconds after the coincident synchronous pulse. Therefore, the coincidence difficulty is alleviated for the sampling operation by means 26 in FIGURE 4.

Nevertheless, the data output of intermediate samplings and storing means 26 in FIGURE 4 will not be synchronous because of the coincident situation.

Accordingly, it is necessary to sample the output of means 26 in a completely synchronous manner in order to obtain a synchronous output; and this is done by a synchronous sampling and storing means 22 and a delay one-shot 98. Delay one-shot 98 is triggered by synchronous timing source 30 and provides an output 99, which connects to synchronous sampling and readout means 22 to time its sampling operation. One-shot 98 can provide any delay greater than one-shot 92, but less than synchronous period T.

FIGURE 5 illustrates a detailed form of circuitry for the combination of data means 21, 26 and 22 in FIGURE 4. Means 21 in FIGURE 5 is precisely the same as given in FIGURE 2. Also, means 26 and 22 in FIGURE 5 are each the same as means 22 in FIGURE 2, except that complementary outputs are provided from bistable 69 in means 26.

FIGURE 7 illustrates another form of the invention, which is a combination of the acceleration and deceleration properties of the previous emodiments, and in some respects has advantages over both of them. Items in FIGURE 7 which correspond to those in previous figures are given like reference numbers.

The free-running speed of motor 11 in FIGURE 7 is initially adjusted by knob 205, so that data would be read by the tape heads roughly at the synchronous rate of the system. Thus, the free-running rate of the system in FIGURE 7 is different from that in either FIGURES 1 or 4, which must free-run substantially faster or slower, respectively, than the synchronous rate. Hence, in FIGURE 7, the free-running rate should be as close to a synchronous rate as can be obtained in practice by a rough speed setting.

Accordingly, the dynamic range of deceleration and acceleration in FIGURE 7 can be much less than that required in either FIGURES 1 or 4.

In FIGURE 7, the free-running rate of motor 11 is determined by the direct-current output of an amplifier 204, when it receives no input signal. This steady-state output is controlled by knob 205 that sets the bias of the amplifier and is calibrated with the nominal free-running rates of tape readout. An acceleration signal provided to the input of amplifier 204 increases its output in accordance with acceleration requirements.

If desired, an initial check of the free-running rate can be made by reading a block of data with the servo feedback disabled to measure and set the free-running speed very close to the synchronous speed.

Another amplifier 203 provides a braking signal in precisely the same manner as was done in FIGURE 1. Amplifier 203 is biased so that it does not provide any output signal in the absence of a deceleration input signal. However, when a deceleration signal is provided, it inhibits gate 13 to block power from amplifier 204. The braking signal is opposite in polarity from power supplied from amplifier 204.

The system of FIGURE 7 has a pulse time-comparison arrangement that is basically the same as in the previously described embodiments. However, a decision function is added in FIGURE 7 to decide whether a deceleration or an acceleration signal should be used at any particular time, in order to obtain maximum effectiveness from acceleration and deceleration signals, and to avoid interference between them.

A bistable 81 is the time comparator that develops the acceleration and deceleration signals in FIGURE 7. It is triggered in the same manner as bistable 31 in FIGURE 1. That is, its opposite inputs are respectively connected to tape-clock source 20, and synchronous timing source 30. The complementary outputs 87 and 88 of bistable 81 provide the respective acceleration and deceleration signals, since either can be provided by inverting the other.

A pair of "and" gates 201 and 202 couple and select one of the bistable outputs 87 or 88 to the inputs of one of power amplifiers 204 or 203.

As in FIGURE 4, a protective bistable 84 is provided, which is set by the tape clock pulses to enable an acceleration control gate 201. Thus, when no tape-clock pulses are provided, bistable 84 disables gate 201 and no undesired signal can be provided.

Gates 201 and 202 have other inputs connected to opposite outputs 216 and 217 of a decision bistable circuit 214. Thusly, only one of gates 201 and 202 can be enabled at any one time by decision bistable 214.

The decision-making function is accomplished in a decision circuit 210 which includes bistable 214 and uses ×2 waves from a multiplier 211 phased with the synchronous-timing pulses to define two phase-domains between the synchronous pulses, as illustrated by the wave in FIGURE 8(B) having its particular phase relationship with respect to the synchronous timing pulses shown in FIGURE 8(A). The input of multiplier 211 is connected to synchronous-timing source 30. Another way of accomplishing the operation of multiplier 211 is to have a binary divider within source 30 providing its output. The input to the binary divider would provide a ×2 multiplied wave of fixed phase. Two complementary outputs 211*a* and 211*b* are provided from multiplier 211.

Decision circuit 210 also includes a pair of "and" gates 212 and 213 to determine in which of the two phase-domains a tape-clock pulse occurs. Each gate 212 and 213 has an input connected respectively to an opposite complementary output of multiplier 211. Another input to each gate 212 and 213 is connected to lead 24 to receive the tape-clock pulses. The output of gate 213 is connected to a set input of bistable 214; and the output of "and" gate 212 is connected through an "or" gate 231 to the reset input of bistable 214. Accordingly, bistable 214 is triggered to one of two output states that correlates with the phase-domain in which the last tape-clock pulse occurred. Hence, the voltage states of outputs 216 and 217 indicate on which side of the midphase point (which is the midpoint between the last two synchronous pulses) that the last tape-clock pulse has occurred. And a particular one of control gates 201 or 202 will be enabled according to whether acceleration or deceleration is required in order to bring the next tape pulse toward the midphase point.

A coincidence difficulty is avoided by providing "and" gate 91 having inputs connected to leads 24 and 32 to receive the tape-clock and synchronous timing pulses, respectively. A delay means 93 is connected between the output of "and" gate 91 and an input of "or" gate 231 to provide a reset pulse to bistable 214 that causes it to make a decision to decelerate the system as soon as any triggering of it by the coincident tape pulse has subsided.

Data reconstruction means 21 and data sampling and readout means 22 in FIGURE 7 are the same as given in FIGURE 1.

The operation of the system in FIGURE 7 is explained using the waveforms of FIGURES 8(A)–(H). Thus, in FIGURE 8(C), a worst possible of the random phasing situations is shown for first tape pulse 201, wherein it is coincident with a synchronous timing pulse. With coincidence, bistable 214 is triggered from "'and" gate 91 and makes a decision to decelerate. The deceleration decision enables deceleration control gate 202 and disables acceleration control gate 201. Hence, a maximum length deceleration output pulse 310 shown in FIGURE 8(E) is passed from bistable 81 to amplifier 203, which provides the output pulse 310 shown in FIGURE 8(G). The tape is decelerated by an amount which assures that a second tape pulse 302 will occur "after" the next synchronous timing pulse to provide a period $\tau_1$ greater than the synchronous period T.

Second tape pulse 302 thus is not coincident, and it is phased in the first half-cycle of the multiplier output wave in FIGURE 8(B) to indicate that further deceleration is required to move the phase of the next tape-clock pulse toward the mid-phase point.

Accordingly, third tape pulse 303 falls closer to the midphase point to generate a deceleration amplifier pulse 312 of lesser duration which does not provide much more acceleration. Nevertheless, it causes the next tape pulse 304 to overshoot slightly to the opposite side of the midphase point. In the absence of a stabilizing circuit 220, tape pulse 304 would cause an acceleration signal to move the phase of the following tape pulse back toward the midphase point, although it might overshoot it. In such case, the system would continually try to move the tape pulses to the midphase point; and overshoot would result in phase-jitter about the midphase point. As long as the jitter is always without about ±175° from the midphase point, a synchronous output can be provided without difficulty at terminals 51–57.

However, the jitter is still objectionable since it causes undesired heating losses within motor 11, due to alternate acceleration and braking signals. Hence, the motor rating can be decreased if the jitter is eliminated or reduced. The jitter is greatly reduced in the system of FIGURE 7 including stabilization circuit 220 that develops a wave shown in FIGURE 8(D), which has pulses centered about the midphase points between the synchronous-timing pulses. Whenever a tape-clock pulse falls within the time-domain of one of these midway pulses, the entire servo feedback is blocked. The system then operates without servo feedback until it drifts out of the time-domain of the midway pulses in FIGURE 8(D).

The midphased wave in FIGURE 8(D) is generated in FIGURE 7 by a pair of tandem-connected one-shots 221 and 222. One-shot 221 provides a 3T/8 delay that triggers one-shot 222 which provides the midphase pulses with a duration of about T/4. The duration of the midphase pulses is not critical, and can be made any required value by adjusting the durations of one-shots 221 and 222.

A pair of "and" gates 223 and 224, each have an input connected to a complementary output of one-shot 222. Another input to each of gates 223 and 224 is connected to lead 24 to receive the tape-clock pulses. Gate 223 is enabled only during the T/4 pulses, and gate 224 is enabled except during the T/4 pulses. Whenever a one-shot pulse falls within the midphase T/4 domain, it passes through gate 223 and sets the output of a bistable 226 to disable both control gates 201 and 202, which blocks the servo feedback. As soon as the system drifts out of the midphase domain, gate 224 is enabled; and the next tape pulse resets bistable 226 to enable the servo feedback until the tape-clock pulses again occur within the midphase domain.

However, once the system has arrived at and has drifted out of the midphase domain, normal-sized acceleration or deceleration control pulses to motor 11 may be so energetic as to cause the next tape pulse to overshoot the midphase domain. Accordingly, feedback level-control 230 is included in FIGURE 7 for decreasing the level of feedback pulses to overcome drift, but to permit full-powered feedback pulses to initially bring the tape pulses into the midphase domain, unless the first tape pulse should fall within it. Circuitry 230 includes a bistable 227 that controls the gain of power amplifiers 203 and 204. Bistable 227 is set by the first output pulse from gate 223, which occurs with the first tape-clock pulse falling within the midphase domain. When set, the output of bistable 227 reduces the gain of amplifiers 203 and 204. The gain is reduced throughout the remaining portion of a tape-data block being read. After the end of the data block, protective bistable 84 resets and creates a pulse from a differentiation circuit 228 that resets amplifiers 203 and 204 to full gain in readiness for the next data block.

In FIGURE 8(G), the three deceleration control pulses 310, 311 and 312 bring the fourth tape pulse 304 of FIGURE 8(C) into the domain of a midphase $T/4$ pulse of FIGURE 8(D). Tape pulse 304 passes through gate 223 to set bistable 226 and 227. Bistable 226 blocks any further control pulses to motor 11 as long as the system does not drift from the midphase domain; and bistable 227 reduces the gain of amplifiers 203 and 204 to provide reduced control pulses to motor 11 whenever the system drifts from the midphase domain.

After tape pulse 304, the next tape pulse 305 remains in the midphase $T/4$ domain. Eventually, the tape pulses drift out, as is exemplified by pulse 306 in FIGURE 8(C). Pulse 306 enables the servo feedback by its reset of bistable 226 through gate 224. Due to the position of pulse 306 in the second half-cycle of the wave from multiplier 211, decision bistable 214 enables acceleration control gate 201 to pass the acceleration pulse 325 in FIGURE 8(H). However, pulse 325 has reduced amplitude because bistable 227 is then set. Reduced pulse 325 slowly accelerates the system so that the next tape-clock pulse 308 falls within the midphase domain. Accordingly, the system is back into its synchronization domain and remains until it again drifts out.

It will be noted by comparing FIGURES 8(A) and (C) that there is a one-for-one correspondence between the tape-bit periods $\tau$ and the synchronization timing pulses. Accordingly, a synchronized output is provided from the terminals 51–57 in FIGURE 7 in the same manner as was provided in FIGURE 1.

If in the design of the invention it is found that the inertia of moving parts is not compatible with the acceleration and/or deceleration capacity of the system to provide immediately a one-for-one correspondence for the first tape-bit period, an intermediate delay means 230 shown in FIGURE 9 can be provided by inserting a respective shift register 231 in each of the channels between the output of reconstruction means 21 and the input to synchronous readout means 22. The first bistable stage of shift register 231 accomplishes the purpose of bistable 66 found in other drawings having circuit 61. The shift timing for the register initially is provided by tape pulses from tape-clock lead 24, until the system stabilizes with tape pulses being in the midphase domain. Then, the shift-register timing is switched to the synchronous source, since the last bits of a data block stored in the shift register when the tape-clock pulses end cannot be shifted out by tape pulses which have ceased. The switch-over is controlled by a bistable 240 having set and reset inputs respectively connected to the set and reset inputs of bistable 227 in FIGURE 7. Thus, in FIG. 9, one of a pair of "and" gates 243 and 244 are enabled by the complementary outputs 241 and 242 of bistable 240. Thus, it is reset prior to the start of a data block so that gate 243 is enabled to pass tape pulses. When the system goes into approximate synchronization, bistable 240 is set and synchronous timing pulses, delayed about $T/2$ by a one-shot 246 are substituted for the clock pulses by enablement of gate 244. These delayed timing pulses will have approximately the timing of the synchronized tape pulses that they replace, and any separation error will not be sufficient to degrade the system.

The bit-length of shift register 231 is chosen according to the amount of time needed for the system to stabilize to the required one-for-one correspondence. Lack of one-for-one correspondence during this period is not important, and the system can then go through any necessary feedback gyrations.

Numerous ways will occur to those skilled in the art for devising various time-comparison and other circuits useable in this invention. For example, once it is realized that the important factor is providing a time-comparison between the synchronous timing pulses and the tape-clock pulses, other forms of circuitry become abvious. Although this invention has been described with respect to particular embodiments thereof, it is not to be so limited, as changes and modifications may be made therein which are within the spirit and scope of the invention as defined by the appended claims.

We claim:

1. A synchronized readout system for data tape, comprising a tape transport mechanism, including motor driving means, and a readout head, a tape clock generator connected to said head for providing tape clock pulses, a synchronous timing source for providing synchronous timing pulses, a time comparator having inputs connected to said tape clock generator and said synchronous timing source, said time comparator providing inverted and noninverted outputs, an acceleration power amplifier, and a deceleration power amplifier, acceleration control gate means connecting the inverted output of said time comparator to said acceleration power amplifier, deceleration control gate means connecting the noninverted output of said time comparator to said deceleration power amplifier, means connecting said deceleration power amplifier output to said motor driving means, means connecting an output of said acceleration power amplifier to said motor driving means, and means for free-running said tape transport mechanism to read out said tape at approximately the synchronous timing rate.

2. A system, as defined in claim 1, including means for inhibiting the output of said acceleration power amplifier in response to an output from said deceleration power amplifier.

3. A system, as defined in claim 1, including a decision bistable means having opposite outputs connected respectively to the acceleration control gate means and the deceleration control gate means, means providing a wave phase-locked with said synchronous timing pulses at twice their repetition rate, a pair of "and" gates receiving said wave and being alternately enabled by opposite half-cycles of siad wave, said pair of "and" gates being connected to said tape clock generator, means connecting the outputs of said pair of "and" gates to set and reset inputs of said decision bistable means, whereby acceleration and deceleration control signals are operated without interference.

4. A system, as defined in claim 3 having a coincident gate with inputs connected to said tape clock generator and said synchronous timing source, a short delay means being connected to an output of said coincidence gate, an "or" gate connecting and output of said short delay means to one input of said decision bistable means.

5. A system, as defined in claim 3, including a first delay means connected to said synchronous timing source, a one-shot connected to said first delay means to provide output pulses centered between synchronous timing pulses, a pair of "and" gates having inputs connected to complementary outputs of said one-shot, another input of said pair of "and" gates being connected to said tape clock generator, a mid-phase bistable device having set and reset inputs connected respectively to outputs of said pair of "and" gates, and means for disabling the outputs of both power amplifiers in response to a setting of said mid-phase bistable means by tape clock pulses when the data readout is synchronized.

6. A system as defined in claim 5 in which said time comparator includes, a comparator bistable circuit, and a protective bistable circuit, each having a set input connected to said tape clock generator, said comparator bistable circuit having a reset input connected to said synchronous timing source, an attenuating bistable circuit having a set input connected to an output of one of said pair of "and" gates, a differentiating circuit connected between an output of said protective bistable circuit and another input of said attenuating bistable circuit, and means connecting the output of said attenuating bistable circuit to both power amplifiers to decrease the level of their outputs when said attenuation bistable circuit is triggered, whereby overshoot is minimized.

7. A synchronized readout system for data tape as defined in claim 3 comprising, shift-register means receiving the readout of one channel from said tape head, another pair of "and" gates, a readout control bistable having set and reset inputs respectively connected to the set and reset inputs of said attenuating bistable circuit, complementary outputs of said readout control bistable being respectively connected to inputs of said another pair of "and" gates, said tape clock generator connected to a second input of one of said "and" gates, a delay means providing approximately a one-half period delay connected between a second input of the other "and" gate and said synchronous timing source, a shift-timing input for said shift-register means being connected to outputs of said another pair of "and" gates and data sampling and readout gate means being connected to an output of said shift register, and a timing input to said data sampling and readout gate means being connected to said synchronous timing source.

8. A synchronized readout system for data tape having at least one channel and comprising a tape transport, driving means for driving said tape transport, and a readout head means for reading data from the tape, a synchronous timing source for providing timing pulses, a tape clock generator connected to said readout head means and constructed to provide tape clock pulses, comparing means for comparing the time relationship of said tape clock pulses and said synchronous timing pulses to produce an output signal having characteristics which are indicative of said time relationships, said driving means constructed to respond to said output signal to control the tape head readout rate, said driving means further being constructed to have operating characteristics which will limit the change in tape head readout rate between any two successive tape clock pulses to an amount which is productive of alternate occurrences in time of said tape clock pulses and said synchronous timing pulses to maintain a one-to-one correspondence therebetween, means for sampling the data output from said readout head means with said synchronous timing pulses to obtain synchronous data output, first bistable storage device means individual to a single channel on said tape and constructed to receive data through said tape head from said individual channel, second bistable device means and gate sampling means connected between said first and second bistable devices, and connecting means for connecting said synchronous timing source to said gating sampling means to enable it with said synchronous timing pulses.

9. A system, as defined in claim 8, in which said comparing means comprises trigger circuit means, set and reset inputs of said trigger circuit means being respectively connected to outputs of said tape clock source and said synchronous timing source, and amplifying means connecting the output of said trigger circuit means to said braking means.

10. A system, as defined in claim 9 including means for disabling a power source from said driving means, said disabling means being engaged by an output of said trigger circuit means.

11. A system as defined in claim 8 in which said first bistable means comprises a shift register, and means for providing tape clock pulses to said shift register as its shift timing.

12. A system, as defined in claim 8 for utilizing non-return to zero recordings, in which each channel includes an inverter being connected to a channel output of said readout head means, an "or" gate having inputs connected to an input and an output of said inverter, an output of said inverter connected to a reset input of said first bistable means, said reset input being an overriding input, and an opposite set input of said first bistable means being connected to said tape clock generator.

13. A system as defined in claim 8 in which said comparing means comprises a control bistable circuit, and a protective bistable circuit, set and reset inputs of said control bistable circuit being connected respectively to said synchronous timing source and said tape clock source, said protective bistable circuit having a set input connected to said tape clock source, means included for resetting said protective bistable circuit after at least one data bit period from it being set, an "and" gate having inputs connected to outputs of said control bistable and protective bistable circuits, and a power amplifier being connected between an output of said "and" gate and said driving means.

14. A system as defined in claim 8 in which said first bistable means comprises a shift register, and means for providing said tape clock pulses to a shift-timing input of said shift register.

15. A system as defined in claim 8 including, a coincident-avoiding timing circuit, comprising an "and" gate receiving inputs from said tape clock source and said synchronous timing source, first delay means connected to an output of said "and" gate, a second delay means providing a shorter delay than said first delay means connected to said synchronous timing source, said connecting means comprising a third delay means providing a longer delay than said first delay means and connected to said synchronous timing source, a second "and" gate having an inhibiting input connected to an output of said first delay means, a second input of said second "and" gate connected to an output of said second delay means, an "or" gate having inputs connected to outputs of said second "and" gate and said first delay means, an output of said "or" gate providing timing pulses to said sampling means.

16. A synchronized readout system for data tape, comprising a tape transport having means for driving said tape and a readout head, a synchronous timing source providing timing pulses, a tape clock generator connected to said head and providing tape clock pulses, means for comparing the timing of said tape clock pulses and said synchronous timing pulses to provide a control output dependent thereon, said control output being connected to said driving means for controlling the tape head readout rate, the inertia of rotating parts of said tape transport mechanism being low in comparison to the maximum torque of said motor to obtain a tape speed with a one-to-one correspondence between synchronous pulses and tape readout bits, means for sampling the data output from said readout head with said synchronous timing pulses to obtain synchronous data output, preliminary data storage means connected to said readout head to provide at least one channel of binary data in response to readout from said head, a coincident-avoiding timing circuit having an "and" gate with inputs connected to the outputs of said tape clock generator and said synchronous timing source to provide an output pulse upon their coincidence, a one-shot device being triggered by an output of said "and" gate, an "and" gate having an inhibiting input connected to an output of said one-shot device, short delay means connected between another input of said "and" gate and said synchronous timing source, an "or" gate having an input connected to an output of said inhibiting "and" gate, a differentiating circuit being connected between the output of said one-shot and another input of said "or" gate, an intermediate sampling and storing means, including an intermediate sampling gate having an input connected to said preliminary data storage means, and having another input connected to an output of said "or" gate, an intermediate bistable circuit connected to an output of said intermediate sampling gate to store its output; a synchronous sampling and storing means, including a synchronous sampling gate with an input connected to an output of said intermediate bistable circuit, a delay device connected between another input of said synchronous sampling gate and said synchronous timing source with the output of said synchronous sampling gate providing synchronous data from said system regardless of coincidence between synchronous timing and tape clock pulses.

References Cited in the file of this patent

UNITED STATES PATENTS

| | | |
|---|---|---|
| 2,839,615 | Sarratt | June 17, 1958 |
| 2,876,004 | Sink | Mar. 3, 1959 |
| 2,963,555 | Brubaker | Dec. 6, 1960 |
| 3,066,285 | McCoy | Nov. 27, 1962 |